United States Patent Office 2,857,351
Patented Oct. 21, 1958

2,857,351

RUBBER-ROSIN-ASPHALT COMPOSITIONS AND THEIR PREPARATION

James H. Carroll, Phillips, Tex., assignor to Phillips Petroleum Company, a corporation of Delaware No Drawing. Application June 14, 1954
Serial No. 436,703

10 Claims. (Cl. 260—27)

This invention relates to a method for rendering rubbery crumb free-flowing. In one aspect this invention relates to the production of free-flowing rubber crumb. In one aspect this invention relates to a method for production of free-flowing rubber crumb by incorporating a rosin acid into a natural and/or a synthetic elastomer, the latter being inclusive of synthetic rubber and synthetic rubber-like materials. In another aspect this invention relates to the production of a synthetic rubber crumb by incorporating a salt of a rosin acid into a latex formed by emulsion polymerization of a polymerizable material, followed by coagulation of the said latex. In another aspect this invention relates to novel bituminous-rubber-rosin acid compositions. In still another aspect, this invention relates to the production of novel bituminous-rubber-rosin acid compositions by uniformly admixing a bituminous material with rubber crumb rendered free flowing by incorporation of rosin acid therein. In still another aspect, this invention relates to the production of novel asphalt-rubber-rosin acid compositions by first forming a free-flowing rubber-rosin acid crumb composition and then admixing same with an asphalt. In still another aspect, this invention relates to novel free-flowing rubber-rosin acid crumb compositions.

Various methods have been employed in the past for the preparation of bituminous-rubber materials such as rubber and asphalt, the problem generally encountered being that of effecting a uniform mixture, i. e., a homogeneous rubber-bituminous material product. For example, rubber has been prepared in a finely divided form and added to asphalt at a temperature suitable for obtaining solution or dispersion of the rubber particles in the asphalt. However, the finely divided rubber material tends to agglomerate and to resist its being uniformly admixed with the asphalt, and it is thus difficult to obtain a homogeneous product when so operating. This invention provides for finely divided rubber, i. e., as a crumb, which is free flowing, and a method for the manufacture of novel free-flowing rubber crumb exhibiting none of the above disadvantages, and, for the production of novel bituminous compositions therefrom; and rubber and bituminous-rubber compositions so produced.

In accordance with this invention a method is provided for rendering free-flowing, a rubber crumb, which comprises incorporating a rosin acid into a rubber crumb.

This invention, in accordance with another concept, provides a method for the preparation of free-flowing rubber crumb, which comprises adding a rosin acid to a rubber and then pulverizing the resulting admixture to crumb size.

In accordance with still another concept, this invention provides a method for producing a free-flowing rubber crumb, comprising incorporating a salt of a rosin acid into a latex formed by emulsion polymerization of a polymerizable material to form a rubbery polymer and effecting coagulation of the rosin-containing latex, under conditions such that the rosin acid salt is converted to rosin acid; resulting coagulum comprising free-flowing rubber crumb product.

In accordance with another concept, this invention provides a method for the production of novel bituminous compositions, comprising admixing with a bituminous material, free-flowing rubber crumb, prepared by incorporating rosin acid into the said crumb; the said crumb having been, in a preferred embodiment, prepared by coprecipitating rosin acid and a rubbery material from a latex.

In accordance with still another concept, this invention provides a method for producing novel bituminous materials, which comprises incorporating rosin acid into a rubber in a manner such that a free-flowing crumb is obtained and then admixing the resulting free-flowing rubber-rosin acid crumb with a bituminous material such as a pitch or an asphalt.

In accordance with still another concept, this invention provides for production of novel bituminous compositions, comprising incorporating a salt of a rosin acid into a latex formed by emulsion polymerization of polymerizable material to form a rubbery polymer, effecting coagulation of resulting latex containing the rosin acid salt, recovering free-flowing coagulum crumb from resulting slurry, and admixing such crumb product with a bituminous material, for example a petroleum pitch or asphalt to provide the said novel composition.

In accordance with still another concept, this invention provides for producing a free-flowing natural rubber crumb by incorporating rosin acid into a natural rubber latex and then coprecipitating the rosin acid and rubber compositions to form the said crumb.

In accordance with still other concepts, this invention provides novel bituminous-rubber-rosin acid compositions; free-flowing natural rubber rosin acid crumb; and for novel synthetic elastomer-rosin acid crumb compositions.

When referring herein to a "rubber," it is meant to include generically both synthetic rubber and natural rubber; another term generic to both natural rubber and synthetic rubber, which can be employed herein is "a sulfur-vulcanizable organic plastic substance containing unsaturated carbon-to-carbon bonds."

Rosin acids from various sources, such as wood and gum rosins, are applicable in the practice of this invention, and can be used as such or treated in various ways to effect purification. They can be used in their crude form, i. e., as a "rosin" such as a wood or gum rosin, or can be an acid product of purification of such "rosin." The disproportionated rosin acids, i. e., rosin acids treated in such a way that selective dehydrogenation or hydrogenation occurs, are advantageously employed in the practice of this invention. Specific examples of rosin acids that can be employed are abietic acid and dehydro-, dihydro-, and tetrahydro-abietic acids.

In one embodiment of this invention, when rosin acid is incorporated with a latex, it is employed in the form of a salt, preferably an alkali metal or ammonium salt, e. g., a soap.

In the production of free-flowing natural rubber-rosin acid crumb and/or free-flowing synthetic elastomer-rosin acid crumb of this invention, the rubber and rosin acid components, the said rosin acid being a solid at ordinary temperatures, can be admixed in any suitable manner, followed by pulverization of the resulting rubber-rosin acid admixture to crumb form, when necessary; preferred temperatures for effecting such admixing, in any event, being within the range of about 60 to 300° F., preferably at about room temperature or somewhat higher, such as for example 70–150° F., although, when desired, temperatures outside these ranges can be employed.

Rosin acid can be admixed on the conventional rubber mill with natural or synthetic rubber, the temperature of the resulting rubber-rosin admixture then being adjusted so that it can be pulverized to form crumb; such temperature being generally below about 32° F. The amount of rosin acid added is that required to render the resulting crumb free-flowing, often from about 25 to 200 parts per 100 parts by weight of rubber.

The rubber-rosin acid compositions of this invention are in form of crumb, and in this form are free-flowing particles especially applicable as components of novel bituminous compositions of this invention, because of their free-flowing characteristics enabling the crumb to be uniformly mixed with the material to provide for a homogeneous rubber-bituminous composition, which otherwise is obtained from mixing ordinary rubber materials with a bituminous material, only after great difficulty, if at all. The rubber-rosin acid crumb compositions of this invention are, because of their free-flowing properties, easily stored and otherwise handled without agglomeration of the rubber crumb particles and problems concomitant therewith.

Although natural rubber-rosin acid crumb compositions can be employed in accordance with this invention, the synthetic rubber-like rosin acid crumb compositions are preferred and are advantageously employed in the preparation of bituminous-ruber-rosin acid compositions of this invention. Exemplary of synthetic rubbers employed in accordance with this invention are homopolymers of conjugated dienes and copolymers of conjugated dienes with vinyl and vinylidene compounds which are copolymerizable therewith. The conjugated dienes employed include those containing from 4 to 10, preferably from 4 to 6 carbon atoms, in the molecule, and are those inclusive of phenyl, alkyl, cyano, cyanato, isocyanato, thiocyanato, isothiocyanato and alkoxy radicals and the like, as substituent groups. Illustrative of conjugated diene reactants employed in the production of synthetic rubbers herein are 1,3-butadiene, chloroprene, 2,3-dimethyl-1,3-butadiene isoprene, piperylene, 3-furyl-1,3-butadiene, 2-methoxy-1,3-butadiene, 1,4-dicyano-1,3-butadiene, 1,4-diisothiocyano-1,3-butadiene, 1-acetoxy-1,3-butadiene, 1,3-dicyanato-2,4-hexadiene, 2,3-diphenyl-1,3-butadiene, 1,4-diisocyanato-1,3-butadiene, 1-thiocyano-2,4-pentadiene, and the like.

Illustrative of compounds copolymerizable with the conjugated diene and containing the vinyildene group

are aryl olefins such as styrene, various alkyl-substituted styrenes; p-chlorostyrene; p-methoxystyrene; alpha-carbazole; vinylacetylene; vinylpyridine; various substituted vinylpyridines, such as 2-methyl-5-vinylpyridine; and other unsaturated hydrocarbons, esters, alcohols, acids, ethers, and the like, of the types described.

While any synthetic rubber can be employed, materials which are used generally have a Mooney value (ML–4) of at least 50, preferably at least 60, and more preferably at least 80. Unmodified rubbers with Mooney values too high to measure are applicable.

In accordance with one embodiment, a free-flowing, difficultly compactible rubber crumb containing rosin acid, is prepared from a rubber latex formed by any known emulsion polymerization method, adjusting the pH of the latex formed to at least 8.0 and preferably 9.0 or higher, adding the desired quantity of rosin acid in the form of a rosin soap, and stirring the resulting admixture while maintaining the latter at a temperature in the range of 110–180° F., preferably 125–170° F. The latex mixture is then creamed with brine and coagulation is effected by the addition of dilute acid to the creamed latex or by adding the creamed latex to the dilute acid. Under these coagulation conditions, rosin soap is converted to rosin acid. Complete conversion of rosin soap to rosin acid is preferred, and to insure this, the crumb is generally kept in the serum at a relatively low pH, such as from about 2–5, preferably about 2–3, for a period of from 10 minutes to four hours, generally 15 minutes to two hours. The crumb product is then washed, generally with dilute acid first and then with the water, and dried to give the desired free-flowing granular crumb product. An alternative method of operation is to charge the rosin soap prior to polymerization, i. e., charge it initially to the emulsion polymerization system with other ingredients in the polymerization recipe. Polymerization is then effected and coagulation is carried out as described above.

When operating in accordance with this embodiment, the free-flowing rubber crumb obtained directly by coagulation and drying is of a small particle size, especially suitable for its incorporation into the bituminous material to form a bituminous rubber-rosin composition of this invention, without the need for further processing such as by pulverizing the crumb prior to incorporating it into the bituminous material.

When referring herein to crumb, the term small particle size is employed to set forth a now preferred crumb size, which is below 20 mesh, preferably below about 40 mesh.

Illustrative of recipes employed in known emulsion polymerization systems to produce a latex in accordance with this invention with which rosin is to be incorporated, are the following:

RECIPES

| Persulfate | Diazothioether | Iron Pyrophosphate (Redox) | Polyalkylene Polyamine |
|---|---|---|---|
| Conjugated monomeric diene.[1] Water. $K_2S_2O_8$. Modifier. Emulsifier. | Conjugated monomeric diene.[1] Water. Modifier (optional). Emulsifier. Diazothioether. | Conjugated monomeric diene.[1] Water. Modifier. Hydroperoxide. Emulsifier. Sugar (optional). Alkali-Metal Pyrophosphate. $FeSO_4 \cdot 7H_2O$. | Conjugated monomeric diene.[1] Water. Electrolyte (optional). Alkali-Metal hydroxide (optional). Emulsifier. Modifier. Hydroperoxide. Polyalkylene Polyamine. |

[1] A conjugated diene reactant alone or together with an unsaturated organic material copolymerizable therewith.

methylstyrene; vinylnaphthalene; acrylic acid; methacrylic acid, methyl acrylate; ethyl acrylate; methyl alpha-chloroacrylate; methyl methacrylate; ethyl methacrylate; acrylonitrile; butyl methacrylate; methyl ethacrylate; methacrylamide; methyl isopropenyl ketone; methyl vinyl ketone; methyl vinyl ether; vinyl acetate; vinyl chloride; vinylidene chloride; vinylfurane; vinyl- In practice the above recipes can be varied widely in the particular combination of ingredients and in their relative proportions.

When preparing the free-flowing rubber crumb containing rosin acid, the amount of rosin acid employed is in any event an amount to make the crumb free-flowing, and generally is in the range between 25 and 200, preferably between 50 and 150, parts by weight per 100 parts of rubber. It will be understood that the amount of rosin acid employed which will render the crumb free-flowing depends upon the particular rubber concerned and its properties.

In the preparation of the bituminous-rubber-rosin acid compositions of this invention, it is advantageous to first form the rubber-rosin acid crumb and to then incorporate the resulting uniform admixture into a bituminous material by any suitable mixing procedure. The bituminous material is advantageously employed in the liquid state during incorporation of the rubber-rosin acid crumb, although it can be admixed with the rubber-rosin acid crumb at room temperature, such as about 70–100° F. The mixing operation, when mixing the rubber-rosin acid crumb with molten asphalt, is generally effected at temperatures above 100° F., generally in the range of from 200–425° F., preferably 250–350° F. The time of mixing is that required to effect a homogeneous product admixture, which will generally vary in the range of from one minute to five hours and more frequently from five minutes to two hours.

The proportion of rubber in the bituminous-rubber-rosin acid compositions is generally from about 1–30, preferably 3–15 percent by weight of the resulting bituminous compositions.

Exemplary of bituminous materials which are advantageously employed in accordance with this invention are naturally occurring asphalts, petroleum asphalts, and pitch from various sources such as is obtained from distillation of tars.

My invention is illustrated by way of the following examples.

*Example I*

Polybutadiene, having a Mooney value (ML–4) of 67, was prepared by emulsion polymerization of butadiene at 41° F. The pH of the latex was adjusted to 12.2 and the latex was then heated to 130–140° F. with live steam. The sodium salt of a disproportionated rosin acid (Dresinate 731) was added to the latex in an amount such that 100 parts of free rosin acid was employed per 100 parts of rubber. The mixture was agitated for 30 minutes while the temperature was maintained at 130–140° F. The latex was then creamed with brine, and poured into dilute sulfuric acid solution. Two drops of tetraethylenepentamine was added to clear the serum. The crumb was agitated in the serum for 20 minutes at 130° F., washed twice for ten minutes each at a pH of 2.0–3.0 at a temperature of 130° F., then four times with water at 140° F. for periods of 7 minutes each. The crumb was maintained at a temperature of 160° F. until dry. When dry, a free-flowing crumb was obtained.

The polybutadiene-rosin acid crumb was screened to obtain a product which would pass through a 17-mesh screen. It was then incorporated into a sample of asphalt having a maximum penetration of 135 at 77° F. The proportion of asphalt to rubber-rosin acid composition, temperature and time of mixing, penetration, cold flow, and recovery values are shown below. Control runs were made using asphalt alone and an asphalt-rosin acid blend. (All parts are by weight.)

| Asphalt, Parts | Rubber-Rosin Acid Crumb, Parts | Rosin Acid,[1] Parts | Mixing | | Penetration [3] | | Cold [4] Flow, 77° F., in. | Recovery,[5] 77° F., percent |
|---|---|---|---|---|---|---|---|---|
| | | | Temp., °F. | Time, Min. | 77° F. | 32° F. | | |
| 100 | 10 | ------ | 300 | 30 | 84 | 14 | 0.83 | 24.1 |
| 100 | 10 | ------ | 300 | 120 | 81 | 20 | 0.69 | 21.2 |
| 100 | 0 | 5 | 300 | 30 | 95 | 13 | 1.41 | 12.5 |
| 100 | 0 | 0 | 300 | 30 | 107 | 17 | 1.55 | [2] 8 |

[1] Parts rosin acid added to asphalt during mixing.
[2] Approximate value. Recovery could not be determined accurately because sample was very soft.
[3] ASTM D5-25. Penetration is defined as the distance that a standard needle, placed in a vertical position, will penetrate a sample under known conditions of loading, time, and temperature. The following conditions were used:
77° F., 0.15 mm. needle/5 sec./100 g. load.
32° F., 0.15 mm. needle/60 sec./200 g. load.
[4] Cold flow was determined at 77° F. by placing a container 2½ inches in diameter and 5/16 inch deep, filled with the material being tested, on its side on a sheet of graph paper and measuring the linear flow from the leading edge of the container after 24 hours.
[5] The sample at 77° F., contained in a box 2⅜ inches in diameter and 1⅜ inches deep, was placed on the platform of a Randall and Stickney thickness gauge. After measuring the initial height of the sample, the ⅜ inch diameter plunger under a 3 ounce load was allowed to penetrate into the sample. After one minute the penetration (tested height) was measured, the plunger was removed, and the sample was allowed to recover for four minutes. The plunger was then lowered until it touched but did not rest on the sample to obtain the recovered height.

$$\text{Percent Recovery} = \frac{\text{recovered height} - \text{tested height}}{\text{initial height} - \text{tested height}} \times 100$$

*Example II*

Unmodified polybutadiene was prepared by emulsion polymerization at 122° F. in accordance with the following recipe:

| | Parts by weight |
|---|---|
| Water | 180 |
| Butadiene | 100 |
| Fatty acid soap, sodium salt | 4.3 |
| $Na_3PO_4 \cdot 12H_2O$ | 0.30 |
| Dextrose | 0.04 |
| Cumene hydroperoxide | 0.05 |

The sodium salt of a disproportionated rosin acid (Dresinate 731) was added to the polybutadiene latex using an amount such that 100 parts of free rosin acid was employed per 100 parts rubber. The rosin soap was added to the latex at 140° F. with constant agitation for a period of 30 minutes. Coagulation was accomplished by excessive creaming with 10 percent brine solution followed by gradual addition of 0.5 percent sulfuric acid solution until the pH of the serum was approximately 2.0. The crumb was then agitated in the serum at the same pH and a temperature of 140° F. for two hours so that the rosin soap could be converted to rosin acid. After removal of the serum the crumb was given one acid wash (pH of 2) for 30 minutes at 140° F., a second acid wash under the same conditions of pH and temperature for 20 minutes and two 20-minute washes at 140° F. A very fine (less than 40 mesh particle size) free-flowing, dry crumb was obtained. (The crumb was dried at 160° F.) Analysis of the crumb showed that 86 parts of rosin acid was present per 100 parts by weight of rubber.

Several compositions were prepared by incorporating different amounts of rubber-rosin acid crumb into asphalt (maximum penetration of 135 at 77° F.). The proportion of asphalt to rubber-rosin acid crumb, temperature and time of mixing, penetration, cold flow, recovery, and softening point of the compositions are shown below. A control run using asphalt alone is also included. (The parts given are by weight.)

| Asphalt, Parts | Rubber-Rosin Acid Crumb, Parts | Mixing | | Penetration | | Cold Flow, 77° F., in. | Recovery, 77° F., Percent | Softening Point, ° F. |
|---|---|---|---|---|---|---|---|---|
| | | Time, min. | Temp., ° F. | 77° F. | 32° F. | | | |
| 100 | 2.0 | 30 | 300 | 108 | 17 | 1.47 | 12 | -------- |
| 100 | 6.0 | 30 | 300 | 96 | 19 | 1.10 | 24 | 118 |
| 100 | 10.0 | 30 | 300 | 88 | 16 | 0.76 | 38 | 125 |
| 100 | 15.0 | 30 | 300 | 76 | 18 | 0.20 | 48 | -------- |
| 100 | 20.0 | 30 | 300 | 62 | 17 | <0.1 | 52 | 143 |
| 100 | 0 | 30 | 300 | 110 | 17 | 1.72 | 9 | 108 |

*Example III*

A sample (10 parts by weight) of the 67 Mooney polybutadiene-rosin acid crumb prepared in Example I was incorporated into 100 parts by weight of a petroleum pitch (aromatic) having a softening point of 190° F. A similar composition was prepared using the unmodified polybutadiene-rosin acid crumb described in Example II. Softening point and penetration values are shown in the table which follows. Controls were run using pitch alone and 100 parts pitch containing 5 parts rosin acid. (The parts given are parts by weight.) In all cases the samples were mixed at 350° F. for 2 hours.

| Pitch, Parts | PBd-Rosin Acid Crumb, Parts | Rosin Acid, Parts | Penetration,[1] 150° F. | Softening Point, ° F. |
|---|---|---|---|---|
| 100 | [2] 10.0 | ------ | 75 | 205 |
| 100 | [3] 10.0 | ------ | 62 | 212 |
| 100 | 0 | 5 | 82 | 191 |
| 100 | 0 | 0 | 74 | 192 |

[1] 150 F./200 g./5 sec.
[2] 67 ML-4 polybutadiene used in composition (PBd=polybutadiene).
[3] Unmodified polybutadiene used in composition.

*Example IV*

Three rubber-rosin acid compositions were prepared to contain 35, 50 or 100 parts by weight of rosin acid per 100 parts rubber. A 157 Mooney (ML-4) 72/28 butadiene/styrene copolymer was used in these compositions. It was prepared by copolymerization of butadiene with styrene in aqueous emulsion at 41° F.

In the preparation of the compositions, the sodium salt of a disproportionated rosin acid (Dresinate 731) was used. It was added in the desired amount to the butadiene/styrene latex at 140° F. and mixed for one hour. After this period of agitation, the latex mixture was creamed with brine and coagulated at a pH of 2 by the addition of sulfuric acid. To allow sufficient time for the rosin soap to be converted to rosin acid, the crumb was stirred in the serum for two hours at a pH of 2 and a temperature of 140° F. Following this treatment the crumb was given two acid washes at a pH of 2 and a temperature of 140° F. It was then washed with cold water until the pH was raised to 7. In each case a finely divided crumb was obtained which did not stick together during drying.

The term "elastomer" employed herein is intended to include both synthetic and natural elastomers, i. e. synthetic rubber and/or natural rubber.

It is to be noted that the present process is physical in the sense that no chemical reaction is detected.

Addition of a salt of rosin acid to the latex is advantageous. However, if desired, rosin acid can be added alone but preferably is added together with a rosin acid salt.

Illustrative of coagulants that can be employed in the process of this invention to cause conversion of rosin acid salt or soap, to rosin acid (i e., upon effecting coagulation) are 0.5 percent aqueous sulfuric acid (Example II), or other mineral acids such as phosphoric or hydrochloric acid. Illustrative of other coagulants that can be employed are alum, zinc sulfate and magnesium sulfate.

Rosin acid is compatible with rubber crumb and provides for increased compatibility of the rubber crumb with molten asphalt. Thus, uniform admixing of rubber crumb with rosin acid, and rubber-rosin acid with asphalt, is achieved simply and efficiently. The particles of rubber-rosin acid of this invention are free-flowing, and can be advantageously handled and admixed with other materials. Rosin acid being highly compatible with rubber, admixtures with other materials can be made with the free-flowing crumb of this invention. Thus, rubber-rosin acid compositions of this invention can be uniformly mixed with bituminous materials to form rubber-rosin acid-bituminous compositions of uniform mixture. Such uniform admixtures are especially suitable as road building materials. Accordingly, a road bed made from the rubber-rosin acid-asphalt products of this invention is of uniform composition throughout and is highly resistant to wear and is less vulnerable than ordinary rubber-asphalt compositions to pitting or otherwise "pulling apart" that ordinarily results from non-uniformity of composition.

Reasonable variation and modification are possible within the scope of the foregoing disclosure and the appended claims to this invention, the essence of which is a method for rendering a crumb free-flowing, which comprises incorporating rosin acid into an elastomer crumb; a method comprising admixing rosin with a rubbery material on a rubber mill followed by pulverizing resulting rubber-rosin acid, and effecting pulverization at such a temperature and having employed such an amount of rosin acid so as to produce resulting free-flowing crumb; a method for producing a bituminous composition comprising admixing together a rubber-rosin acid crumb and a bituminous material; and, rubber-rosin acid crumb and bituminous-rubber-rosin acid compositions so-produced—this invention in a now preferred embodiment providing a method for producing a free-flowing rubber crumb, which comprises incorporating a salt of a rosin acid into a latex which has been formed by emulsion polymerization of a polymerizable material to form a rubbery polymer, effecting coagulation of said latex thus obtaining a slurry containing a free-flowing coagulum and recovering said coagulum from said slurry as a free-flowing crumb product; and, production of bituminous compositions, by incorporating a rosin acid with a rubber and admixing the resulting rubber-rosin acid admixture with the bituminous material; in a preferred embodiment admixing the above said coagulum with a bituminous material to form a bituminous-rubber-rosin acid composition.

I claim:

1. A method for the production of a bituminous-sulfur vulcanizable-rubber-rosin acid composition containing 1–30 weight percent of said rubber comprising admixing together a free-flowing rubber-rosin acid crumb and a bituminous material selected from the group consisting of an asphalt and a pitch, said crumb having been formed by the emulsion polymerization of an unsaturated monomeric material comprising a conjugated diene to form a latex of a sulfur vulcanizable rubbery polymer, admixing with said latex an amount of rosin soap equivalent to from 25–200 parts by weight of rosin acid per 100 parts of rubbery polymer in said latex, said amount being effective to produce a free-flowing crumb while agitating the resulting latex-rosin admixture; creaming said latex, and acidifying and coagulating said latex, thus obtaining a slurry containing a free-flowing coagulum and maintaining said slurry at pH from 2–5 for a period of time to convert rosin soap to rosin acid, and separating the coagulum from said slurry.

2. A method for producing a bituminous-rubber-rosin acid composition containing 1–30 weight percent of said rubber which comprises incorporating with agitation a rosin acid salt with a latex formed by emulsion polymerization of a polymerizable material comprising a conjugated diene to form a sulfur-vulcanizable, carbon-carbon unsaturated rubbery polymer, the amount of said salt being effective to produce a free-flowing crumb coagulum and being an amount equivalent to a rosin acid content of 25 to 200 parts per 100 parts of rubber in said latex; creaming said latex, and acidifying and coagulating said latex to form a slurry of coagulum and maintaining said slurry at a pH in the range from 2 to 5 for a period of time to convert said rosin acid salt to rosin acid, thus obtaining a slurry containing a free-flowing coagulum; recovering said free-flowing coagulum from said slurry; and admixing said free-flowing coagulum with a bituminous material to form a bituminous-rubber-rosin acid composition, said bituminous material being selected from the group consisting of an asphalt and a pitch.

3. The method of claim 2 wherein said rosin acid salt is admixed with said polymerizable material to be polymerized.

4. The method of claim 2 wherein said rosin acid salt is added to said latex.

5. A method for producing an asphalt-rubber-rosin composition which comprises effecting emulsion polymerization of an unsaturated monomeric material comprising a conjugated diolefin to form a sulfur vulcanizable rubbery polymer, adjusting pH of resulting latex to a value not less than 8.0, admixing with said latex an amount of rosin soap equivalent to from 50–150 parts by weight of rosin acid per 100 parts of rubbery polymer in said latex, said amount being effective to produce a free-flowing crumb, agitating the resulting latex-rosin admixture while maintaining same at a temperature of from 110–180° F., creaming said latex, and then effecting coagulation of said latex by addition of a dilute aqueous acid thereto, thus obtaining a slurry containing a free-flowing coagulum, maintaining said slurry at a pH of from 2–5 for a period of from 10 minutes to four hours, thereby converting remaining rosin soap to rosin acid, separating coagulum from said slurry and then admixing said coagulum with an asphalt to form a uniform asphalt-rubber-rosin composition containing from 1–30 weight percent of said rubber and recovering the last said composition.

6. A new composition formed by the method of claim 1.

7. A method according to claim 8 wherein said emulsion polymerization of an unsaturated monomeric material is the homopolymerization of 1,3-butadiene.

8. A method for producing an asphalt-rubber-rosin composition which comprises effecting emulsion polymerization of an unsaturated monomeric material comprising a conjugated diene to form a sulfur vulcanizable rubbery polymer, adjusting pH of resulting latex to a value not less than 8.0, admixing with said latex an amount of rosin soap equivalent to from 25–200 parts by weight of rosin acid per 100 parts of rubber polymer in said latex, said amount being effective to produce a free-flowing crumb, agitating the resulting latex-rosin admixture while maintaining same at a temperature of from 110–180° F., creaming said latex, and then effecting coagulation of said latex by addition of a dilute aqueous acid thereto, thus obtaining a slurry containing a free-flowing coagulum, maintaining said slurry at a pH of from 2–5 for a period of from 10 minutes to four hours, thereby coverting remaining rosin soap to rosin acid, separating coagulum from said slurry and then admixing said coagulum with a bitumous material selected from the group consisting of an asphalt and a pitch to form a uniform composition containing from 1 to 30 weight percent of said rubber.

9. A new composition according to claim 6 wherein said unsaturated monomeric material comprising a conjugated diene is a mixture of 1,3-butadiene and styrene and the rubber formed by said emulsion polymerization is a copolymer of said 1,3-butadiene and said styrene.

10. A composition of claim 6 wherein said conjugated diene is 1,3-butadiene.

References Cited in the file of this patent

UNITED STATES PATENTS

| | | |
|---|---|---|
| 1,821,939 | Hill et al. | Sept. 8, 1931 |
| 2,549,558 | Young et al. | Apr. 17, 1951 |
| 2,608,541 | Troyan et al. | Aug. 26, 1952 |
| 2,611,719 | Borders | Sept. 23, 1952 |
| 2,659,677 | Schulze | Nov. 17, 1953 |
| 2,706,184 | Schulze | Apr. 12, 1955 |

OTHER REFERENCES

Endres et al.: Ind. & Eng. Chem., February 1951, vol. 43, No. 2, pages 334 thru 340.

Howland et al.: Ind. & Eng. Chem., May 1953, vol. 45, No. 5, pages 1053 thru 1059.